Nov. 12, 1929.  O. C. KIGER ET AL  1,735,117
RELIEF VALVE FOR PRESSURE PUMPS
Filed Feb. 4, 1928
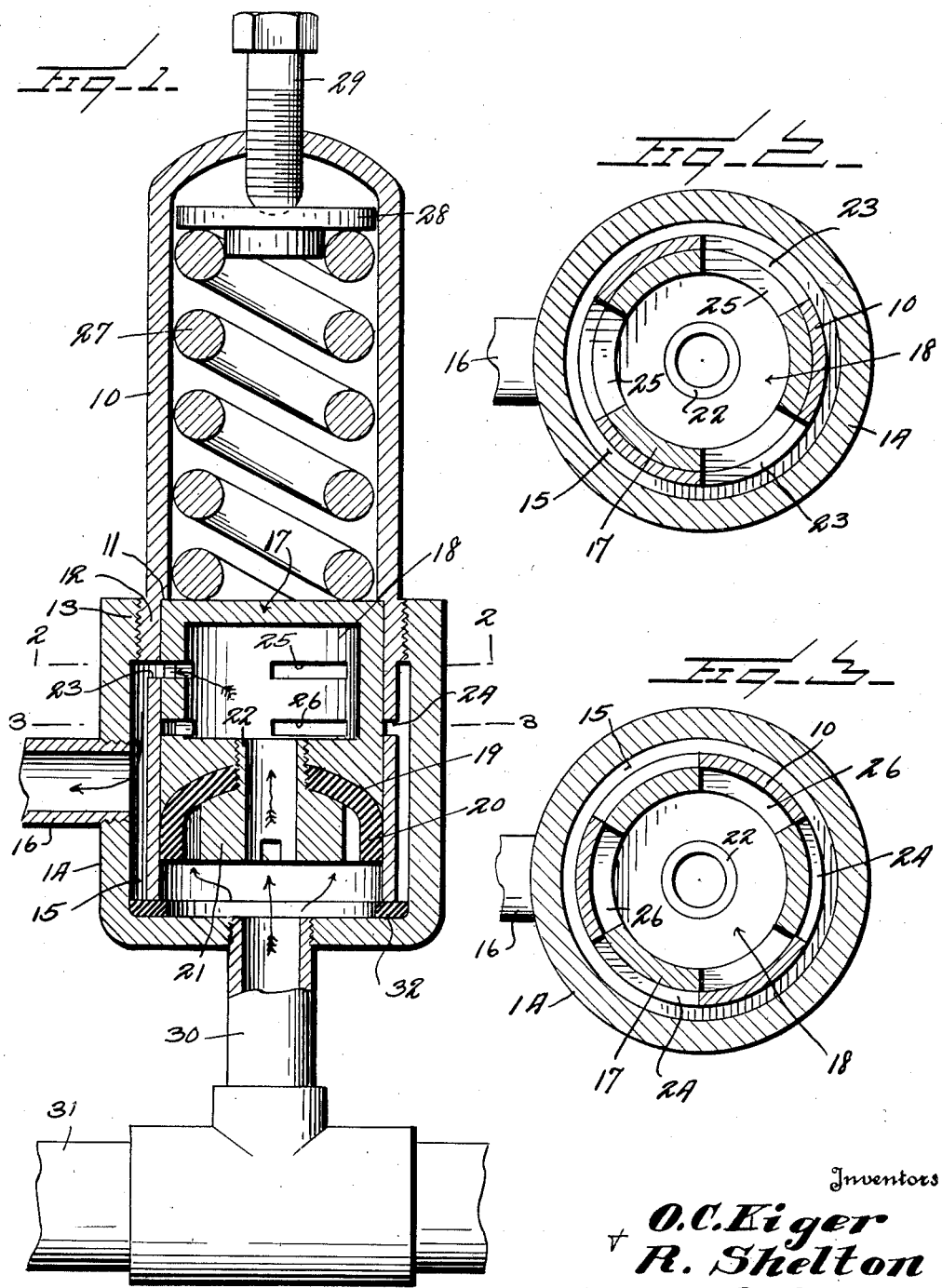
Inventors
O. C. Kiger
& R. Shelton
By Watson E. Coleman
Attorney Patented Nov. 12, 1929

1,735,117

UNITED STATES PATENT OFFICE

OMAR C. KIGER AND RAY SHELTON, OF YAKIMA, WASHINGTON

RELIEF VALVE FOR PRESSURE PUMPS

Application filed February 4, 1928. Serial No. 251,970.

This invention relates to relief valves such as are used in pressure pumps for the purpose of relieving the pump when the pressure gets too high.

One of the objects of the present invention is to provide a very simple, readily operated and compact relief valve of this character which may be easily applied in connection with any pump of the character stated.

A further object is to provide means whereby the relief valve may be readily disassembled in order to permit repair of the parts or replacement.

A still further object is to provide a relief valve which includes in its organization a ported piston operating in a ported cylinder and so arrange these ports in the piston and cylinder that though the relief valve may rotate or turn from time to time within the cylinder in which it operates, the degree of port opening at any instant will be independent of the rotative position of the piston.

Another object is to provide means whereby the piston valve may be urged away from its relief position by a spring, and provide means for tensioning the spring.

Other objects will appear in the course of the following description.

Our invention is illustrated in the accompanying drawing, wherein:—

Figure 1 is a vertical sectional view of a relief valve constructed in accordance with our invention;

Figure 2 is a section on the line 2—2 of Figure 1;

Figure 3 is a section on the line 3—3 of Figure 1.

Referring to this drawing, 10 designates a cylinder which is closed at one end and open at the other and which intermediate its ends is formed with a shoulder 11. This cylinder just below the shoulder 11 is outwardly extended, as at 12, and formed with screw-threads 13 for engagement by screw-threads on the upper end of a chamber 14 whose internal diameter is larger than that of the external diameter of the cylinder so that a space 15 is formed between this chamber wall 14 and the exterior wall of the cylinder. From this space extends the outlet pipe 16.

Disposed within the lower end of the cylinder 10 and below the shoulder 11 is a piston valve, designated generally 17. This is hollow at its upper end to provide a chamber 18 and the lower end of the piston valve is concavely recessed at 19. Disposed in this concave recess and forming part of the piston valve is a packing cup 20 of relatively heavy rubber or like material, this rubber cup extending down below the piston and bearing tightly against the inner face of the cylinder 10. This packing cup is held in place by a hollow or tubular nut 21 which has a tubular shank 22 having screw-threaded engagement with a central opening in the bottom of the piston.

The cylinder 10 is formed with two rows of arcuate ports, the ports of one row being designated 23 and the ports of the row below as 24. It will be seen from Figures 2 and 3 that the ports 23 are staggered with relation to the ports 24. There are preferably three ports in each row. The piston is provided with two rows of ports 25 and 26, each port having the same length as the ports 23 and 24 but the ports 25 and 26 are disposed in align ment, one above the other, and not in staggered relation. The reason for this will be later stated.

Disposed within the closed end of the cylinder 10 is a compression spring 27, which at its lower end bears against the piston and at its upper end bears against a disk 28 having a central hub acting to center the coiled spring. Extending through the closed end of the cylinder 10 is a screw 29 which bears against the disk 28 and by its adjustment acts to tension the spring to a greater or less degree. In the bottom of the chamber wall 14 there is provided the inlet pipe 30 which is connected to the pump outlet line shown diagrammatically in Figure 1, the outlet line being designated 31 and extending beyond the inlet 30.

In the operation of this invention, the piston is normally urged away from the shoulder 11 by the spring 27 and thus passage through the ports in the piston and cylinder is cut off. When the pump outlet line or discharge pipe is closed, increased pressure will be transmitted beneath the piston and this increased pressure will force the piston up against the action of the spring 27 which is thus compressed. When the piston has risen so as to abut against the shoulder 11, the ports 25 and 26 will be in line with the ports 23 and 24, but inasmuch as the ports 23 and 24 are staggered with relation to each other and the ports in the piston are not, it will be seen that the water may pass out through the ports 23 but not through the ports 24 or vice versa, depending upon how far the piston has been rotated. If the piston should be rotated so that half of the ports 23 are disclosed and half of the ports 24 are disclosed, it will be obvious that the same amount of water will be discharged as if the ports 23 were fully opened and the ports 24 closed or the ports 24 fully opened and the ports 23 closed. These staggered ports in the cylinder 10 are, therefore, provided in order to permit the piston to rotate or shift rotatively around its axis without in any way obstructing the outward passage of water through said ports and without in any way reducing or increasing the total amount of port opening. The water passes out through the ports into the space 15 and from thence out through the outlet pipe 16 back to the original source of pump supply.

Obviously the pressure may be such that the piston valve is not forced to its fully open position but the port openings may be only half opened, in which case, of course, the piston valve will take care of the relatively slighter excess pressure and relieve the pump to this extent, the amount of movement of the piston valve depending, of course, upon the pressure behind it which is to be relieved.

It will be seen that this relief valve is extremely simple and that it has but few parts. The interior mechanism of the valve is readily accessible for repair, replacement or cleaning by simply removing the chamber casing 14 by unscrewing it from the cylinder. When this has been removed, the piston valve may be readily withdrawn, if necessary, and the spring taken out of the gasket 32 replaced. The tension on the spring may be at any time increased or decreased by the proper adjustment of the screw 29. There is only one gasket 32 in the entire relief valve assemblage, thus doing away with the use of gaskets which are very liable to blow out under high pressure. No gauges or special wrenches are required for the purpose of adjusting the tension of the spring, as the screw may be turned by an ordinary wrench and the adjustment is relatively delicate and can be readily made at any time.

We claim:—

1. A valve of the character described, including a cylinder open at one end, a hollow piston valve movable longitudinally through the cylinder but free to rotate therein, the cylinder having a plurality of circumferentially extending series of port openings, the port openings of one series being disposed in staggered relation to the port openings of the other series, and the piston having a plurality of series of port openings disposed in longitudinal alinement with each other, whereby the total port openings will be the same in all rotative positions of the piston, means for forcing the piston valve to a position where its supports are in incidence with the cylinder ports, and means yieldingly resisting such movement.

2. A pressure relief valve including a cylinder having ports, a hollow piston valve movable longitudinally through the cylinder but being free to rotate therein and having ports adapted to coincide with the cylinder ports in one position of the valve, means for admitting fluid under pressure behind the piston valve to force it to a position where its ports are in coincidence with the cylinder ports, and resilent means resisting such movement, the cylinder having a plurality of circumferentially extending series of port openings, the port opening of one series being disposed in staggered relation to the port openings of the other series and the piston having a plurality of series of port openings disposed in longitudinal alignment with each other whereby the total port opening will be the same in all rotative positions of the piston.

In testimony whereof we hereunto affix our signatures.

OMAR C. KIGER.
RAY SHELTON.